Oct. 16, 1962

F. A. BAKER 3,059,173

SUB-HARMONIC SIGNAL GENERATOR EMPLOYING
A MAGNETIC AMPLIFIER

Filed April 15, 1959

WITNESSES

INVENTOR
Floyd A. Baker

BY

ATTORNEY

United States Patent Office 3,059,173
Patented Oct. 16, 1962

3,059,173
SUB-HARMONIC SIGNAL GENERATOR EMPLOY-
ING A MAGNETIC AMPLIFIER
Floyd A. Baker, Gardena, Calif., assignor to Westinghouse
Electric Corporation, East Pittsburgh, Pa., a corporation of Pennsylvania
Filed Apr. 15, 1959, Ser. No. 806,702
12 Claims. (Cl. 323—89)

This invention relates to improvements in subharmonic signal generators, and more particularly to subharmonic signal generators for obtaining even sub-harmonics of a source frequency and employing a magnetic amplifier circuit.

In summary, the apparatus employs a two-stage saturable reactor magnetic amplifier in which feedback is applied from the output load impedance to the input stage in a manner to cause a controlled instability and provide an output signal which is an even sub-harmonic of the frequency of an alternating current source.

A primary object of the invention is to provide a new and improved sub-harmonic signal generator.

Another object is to provide a new and improved sub-harmonic signal generator employing a magnetic amplifier.

Figure 1:
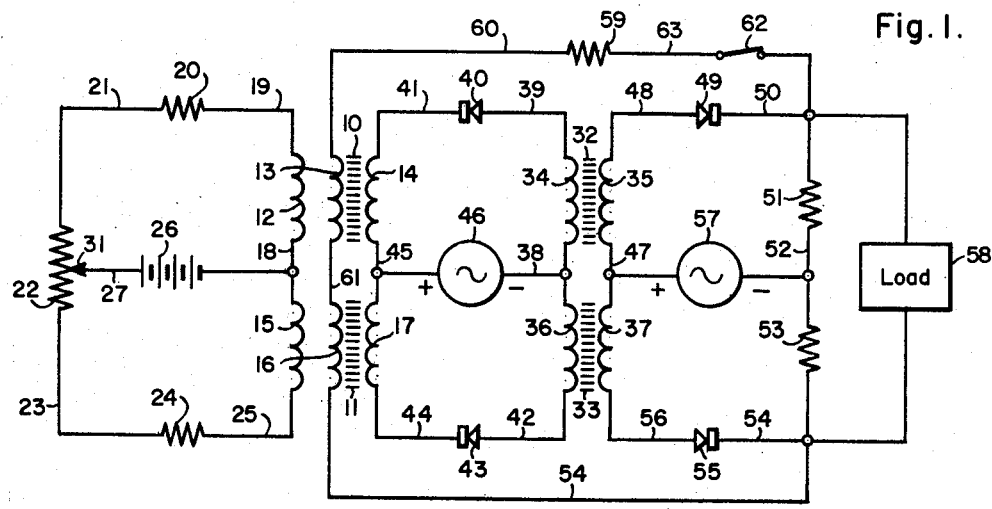
Figure 2:
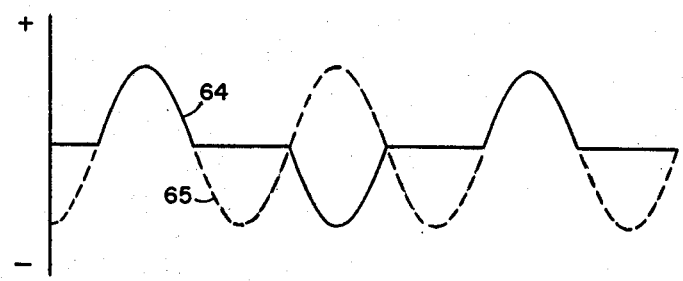

Other objects and advantages will become apparent after a study of the following specification when read in connection with the accompanying drawings, in which:

FIGURE 1 is a schematic circuit diagram of the invention according to the preferred embodiment thereof; and FIG. 2 is a graph illustrating the operation of the apparatus of FIG. 1.

In FIG. 1, a pair of saturable cores 10 and 11 are provided, each of the saturable cores having three windings inductively coupled thereto, core 10 having windings 12, 13, and 14, and core 11 having windings 15, 16, and 17. One terminal of each of the pair of windings 12 and 15 are connected together by lead means 18, and the other terminals of the windings 12 and 15 are also connected by way of lead 19, resistor 20, lead 21, potentiometer 22, lead 23, resistor 24 and lead 25. The aforementioned lead 18 has connected thereto one terminal of a battery or other source of direct current potential 26 which has the other terminal thereof connected by lead 27 to the arm 31 of potentiometer 22.

A second pair of saturable magnetic cores 32 and 33 are provided, core 32 having windings 34 and 35 inductively coupled thereto, and core 33 having windings 36 and 37 inductively coupled thereto, windings 34 and 36 comprising control windings and windings 35 and 37 comprising load windings. One terminal of each of the windings 34 and 36 are connected by the lead 38. The other terminal of winding 34 is connected by lead 39, rectifier 40 and lead 41 to one terminal of the aforementioned winding 14 associated with the aforementioned saturable core 10. The other terminal of winding 36 of core 33 is connected by way of lead 42, rectifier 43 and lead 44 to one terminal of the aforementioned winding 17 associated with the aforementioned saturable core 11. The other terminals of the windings 14 and 17 respectievly are connected with each other by lead 45. Lead 45 and the aforementioned lead 38 have connected therebetween a source of alternating current potential 46 of suitable frequency.

One terminal of each of the aforementioned windings 35 and 37 are connected with each other by way of lead 47, and the other terminals of the windings 35 and 37 are interconnected by way of lead 48, rectifier 49, lead 50, resistor 51, lead 52, resistor 53, lead 54, rectifier 55 and lead 56. Leads 47 and 52 have applied thereacross an alternating current voltage obtained from an additional source of alternating current potential 57 which is of the same frequency and in synchronism with the alternating current source 46, the sources 46 and 57 having instant relative polarities with respect to each other as shown in the drawing.

Leads 50 and 54 may have connected thereacross a load impedance shown in block form as 58. It will be understood that resistors 51 and 53 may also be considered as load impedances.

The aforementioned feedback loop includes lead 50, single pole, single throw switch 62, lead 63, resistor 59, and lead 60 which is connected to one terminal of the aforementioned winding 13 on saturable core 10. The other terminal of the winding 13 is connected by way of lead 61 to one terminal of the winding 16 of saturable core 11, and the other terminal of winding 16 is connected to the aforementioned lead 54.

The windings 12 and 15 are provided for, while energized, supplying steady magnetic field components to their respective cores 10 and 11. The battery or other source of potential 26 provides a voltage which may be applied between lead 18 and arm 31, potentiometer 22, leads 21 and 23, resistors 20 and 24 respectively, and leads 19 and 25 respectively, to the aforementioned windings 12 and 15 respectively, both of which are energized by the current from battery 26. The relative degrees of energization of windings 12 and 15 may be varied by adjusting the setting of potentiometer arm 31. The steady fields set up by windings 12 and 15 may be considered as biasing the saturable cores 10 and 11 respectively, in predetermined manners.

The biasing circuit including windings 12 and 15 may be omitted if desired, so long as cores 10 and 11 are similar or matched, windings 14 and 17 are matched, and windings 13 and 16 are matched.

The operation of the apparatus may be most readily understood by neglecting for the moment the function of the feedback loop and the feedback windings 13 and 16. Assuming that switch 62 is open so that there is no energization of these windings, the operation of the apparatus would follow the pattern of operation of a two-stage magnetic amplifier employing saturable magnetic cores.

The first stage comprising aforementioned saturable cores 10 and 11 and associated windings of the magnetic amplifier circuit may be said to be predominantly ampere-turn controlled. The second stage, comprising saturable cores 32 and 33 and associated windings may be said to be predominantly volt-second controlled. There are provided in the second stage two saturable magnetic core members each having wound thereon a control winding and a load winding. An alternating current source is coupled to the load windings by means of rectifiers which are poled so that on first alternations of preselected polarity of the alternating current, a voltage is applied to the load windings to drive the magnetization level of the cores toward saturation, and on second alternate half cycles or alternations of the alternating current, a voltage is applied to the control windings to reset the cores, or withdraw the magnetization level of the cores from saturation. Control elements are connected in series with the control windings respectively and a second alternating current source to control the magnetization level set by the control windings on reset half cycles of operation. After the saturable cores have become saturated during the half cycle of voltage application to the load windings, the impedances presented thereby will drop from a very high value to a very low value, and the voltages across the load impedances connected in series with the load windings will sharply rise to substantially the same voltage as that of the alternating voltage source. The time integral of the voltage developed across the load impedances, therefore, will be determined by the magnetization level set in the cores during the half cycle of voltage application to the control windings. Inasmuch as this magnetization level is functionally related to the control elements in series with the control windings, the time integral of the voltage developed across the load impedances will be functionally related to the impedances of the aforesaid control elements.

In FIGURE 1, the first stage of the magnetic amplifier comprises the saturable magnetic core members 10 and 11 with their respective load windings 14 and 17 and their respective control or bias windings 12 and 15. The feedback windings 13 and 16 operate in manners which will be described hereinafter. The control or bias windings 12 and 15 are connected to the aforementioned source of potential 26 to be energized therefrom.

Core members 10 and 11 are periodically driven toward saturation by the source of alternating current potential 46 having its opposite terminals connected by two parallel unidirectional current paths, one of the paths including winding 14, rectifier 40 and winding 34, and the other path including winding 17, rectifier 43 and winding 36.

Due to the inclusion of the rectifiers 40 and 43 in the current paths, cores 10 and 11 will be driven toward saturation on only one-half cycle of the applied voltage from source 46. The aforementioned second voltage source 57 in synchronism with source 46 is provided to drive core members 32 and 33 toward saturation on the other half of each cycle of the voltage sources. The opposite terminals of voltage source 57 are connected by two parallel current paths, one path including winding 35, rectifier 49 and resistor 51, and the other path including winding 37, rectifier 55 and resistor 53. Output signals are derived from across the impedances 51 and 53 and applied to the load impedance 58.

Assume for purposes of explanation that the switch 62 is open so that no feedback signal is applied to the feedback windings 13 and 16. Assume further, by way of explanation, that potentiometer arm 31 is set so that the currents flowing through windings 12 and 15 are unequal and accordingly the biasing fields on cores 10 and 11 are unequal. When the instant polarity of the voltage source 46 is opposite to that shown in FIG. 1, current will flow through windings 14 and 17 to drive cores 10 and 11 toward saturation. The reactors or transformers incorporating core members 10 and 11 are preferably designed with respect to the reactors or transformers incorporating cores 32 and 33 such that when rectifiers 40 and 43 conduct, substantially all of the voltage from source 46 will initially appear across windings 14 and 17, with very little voltage appearing across windings 34 and 36. At certain points or instants in the half cycle during which rectifiers 40 and 43 conduct in their forward direction, cores 10 and 11 will saturate so that the voltage from source 46 will no appear across windings 34 and 36 of cores 32 and 33, respectively, to drive these cores to certain predetermined unsaturated magnetization levels. During the same time interval of this last named alternation or half cycle, rectifiers 49 and 55 are reverse-biased due to the polarity of the voltage from source 57, so that cores 32 and 33 are reset during this half cycle of the voltage sources 46 and 57. As will be understood, the amount of reset of cores 32 and 33 will depend upon the times in the half cycle during which cores 10 and 11 saturate, and this, in turn, is dependent upon the voltages applied from bias source 26. Because of the unbalance of currents in windings 12 and 15, the cores 10 and 11 will not saturate at the same time.

On the next half cycle of voltage sources 46 and 57 when rectifiers 49 and 55 conduct, almost all of the voltage from source 57 will appear across windings 35 and 37 until cores 32 and 33 saturate. When the cores 32 and 33 saturate, most of the voltage from source 57 will appear across impedances 51 and 53. As will be understood, cores 32 and 33 will not saturate at the same time due to the differential flux levels established in cores 10 and 11 by the action of the bias voltages applied to windings 12 and 15 respectively, so that the polarity of voltage pulses or signals appearing between leads 50 and 54 and across the output load impedance 58 will depend upon which of the cores 32 and 33 saturates first; and the magnitude of the output voltage is dependent upon the time interval which elapses between the saturation of one core and saturation of the other.

For example, if the relative biases applied to windings 12 and 15 have certain predetermined relative values a certain one of the cores 10 and 11 will be reset to a greater degree than the other core of the pair so that on the half cycle when rectifiers 40 and 43 conduct, one of the cores 10 and 11 will saturate before the other. This means that the volt-second integral applied across one of the windings 34 and 36 will be greater than that applied across the other so that one of the cores 32 and 33 will be reset to a greater degree than the other. On the next half cycle of the alternating current sources when rectifiers 49 and 55 conduct, one of the cores 32 and 33 will saturate before the other so that a larger average voltage will appear across one of the impedances of the pair 51 and 53 than appears across the other. The resulting output voltage across the load impedance 58 will be the difference between the voltages appearing across impedances 51 and 53.

In preparing the circuit for operation as a subharmonic signal generator, the arm 31 of potentiometer 22 is moved to a position to balance the bias currents in windings 12 and 15 and accordingly balance the bias fields on cores 10 and 11 so that in the absence of any feedback signal they both saturate at substantially the same point or instant in the same alternation from source 46, and under these conditions of operation, the output across load impedance 58 is reduced to a value approaching zero, as will be readily understood from the foregoing description of the operation.

Let it be assumed now by way of description, that the switch 62 is closed so that a feedback signal is applied to windings 13 and 16, the signal being obtained by feedback of a portion of the voltage developed across the output load impedance 58. It will be recalled that the object of the invention is to provide apparatus for obtaining sub-harmonics of a given fundamental frequency, in this case, the frequency of the sources of potentials 46 and 57. The feedback loop including resistor 59 and windings 13 and 16 provides negative feedback. If a disturbance occurs to cause a small output across the load resistor 58 in some gating or conducting half cycle of reactors 32 and 33, this output will be fed back to reactors 10 and 11 in their reset half cycle. The gating half cycle is the half cycle during which the cores saturate. In accordance with the instant polarities of the generators 46 and 57 shown in FIG. 1, the portion of the circuit including generator 57 is in its gating half cycle, whereas the portion of the circuit including generator 46 is shown in its reset half cycle. If, as aforementioned, an initial disturbance occurs across the load resistor 58, this output will be fed back to reactor cores 10 and 11 in their reset half cycle. The output of the amplifier as it appears across load 58 will not be affected by this feedback until the next gating half cycle of reactor cores 32 and 33 because of the inherent "dead time" or transportation lag of magnetic amplifiers. By proper choice of the value of the feedback resistor 59 and the windings 13 and 16 including the number of turns on the windings, the feedback voltage is made to over-correct for the initial disturbance, resulting in a voltage across load impedance 58 of a polarity opposite to that of the initial disturbance and of larger magnitude. This last-named voltage, in turn, is fed back to windings 13 and 16 associated with cores 10 and 11 respectively, delayed, and in the next gating half cycle of reactor cores 32 and 33 appears across the load resistor 58 as a voltage of still larger magnitude and with a polarity the same as that of the initial disturbance. This action continues to build up until full output is reached, as determined by circuit parameters.

Another way of describing the feedback operation of the circuit under certain assumed circuit conditions is as follows: assume the circuit has been operating; now when voltage 57 is zero and going positive core 32 is saturated. The output voltage is fed back to the first stage which saturates core 10 and cuts off core 11. Now as the voltage 57 goes to zero and starts going negative, core 10 is now saturated and core 11 is cut off. Therefore one core is reset to cut off and the other core is not reset. On the next positive half cycle of voltage 57, core 33 is saturated and the output pulse is of opposite polarity. This negative output pulse resets core 10 to cut off and resets core 11 to saturation. This is a continuous process.

In FIG. 2, to which particular attention is directed, the waveform 64 of the sub-harmonic output signal developed across load impedance 58 is shown in solid line, whereas the fundamental frequency waveform 65 of one of the sources 46 or 57 is shown in dashed line.

The directions of winding of the various coils are chosen to provide for operation of the circuit in the desired manner.

There has been provided a sub-harmonic signal generator circuit the operation of which is, in effect, similar to that of a multivibrator. The frequency of the output of the apparatus of the instant invention is not dependent upon the parameter values in the circuit but is fixed at one half the supply frequency of the sources of alternating current 46 and 57. With proper selection of component values and proper adjustment, the fundamental frequency component in the output may be maintained at a very low value, well under 5 percent.

There has been provided, then, apparatus well suited to accomplish the aforementioned objects of the invention.

The two separate sources of alternating current of the same frequency shown at 46 and 57 could, if desired, be separate secondary windings of a transformer having the single primary thereof energized by an alternating current source of suitable frequency and preferably substantially pure waveform.

Whereas a direct current source has been shown at 26, it should be understood that an alternating current source of the same frequency as source 46 and in synchronism therewith could be used if desired.

Whereas the invention has been shown and described with respect to a preferred embodiment thereof which gives satisfactory results, it should be understood that changes may be made and equivalents substituted without departing from the spirit and scope of the invention.

I claim as my invention:

1. Sub-harmonic signal generator apparatus comprising, in combination, first saturable magnetic core means including a first pair of cores and having a source of alternating current operatively connected thereto, said first saturable magnetic core means being adapted to have the saturation times of the first pair of cores controlled by a feedback signal, other saturable magnetic core means including a second pair of cores operatively connected to the first saturable magnetic core means and adapted to have the reset of the second pair of cores controlled by the saturation times of the first pair of cores, circuit means operatively connected to the other saturable magnetic core means for obtaining an electrical output signal, and other circuit means operatively connecting said first-named circuit means to said first saturable magnetic core means to supply a feedback signal thereto, said feedback signal being of alternately positive and negative polarity.

2. Sub-harmonic signal generator apparatus comprising, in combination, first saturable magnetic core means having feedback winding means and first load winding means associated therewith, a first source of alternating current of preselected frequency, second saturable magnetic core means including control winding means and second load winding means inductively coupled thereto, circuit means including first rectifier means operatively interconnecting said first source of alternating current, said first load winding means, and said control winding means, a second source of alternating current of the same frequency as said first source and having a predetermined polarity relationship to the first source, impedance means, second rectifier means, other circuit means interconnecting said second source of alternating current, said impedance means, said second rectifier means and said second load winding means, and further circuit means connecting said feedback winding means across said impedance means to be energised by signals of alternately positive and negative polarity developed across said impedance means.

3. Sub-harmonic signal generator apparatus comprising, in combination, first saturable magnetic core means having bias, feedback and first load winding means, the bias winding means having a biasing potential applied thereto, the feedback winding means being adapted to have a feedback signal applied thereto, a first source of alternating current, second saturable magnetic core means having control winding means and second load winding ceans, circuit means including rectifier means interconnecting the first load winding means, the control winding means and said first source of alternating current, impedance means, a second source of alternating current of the same frequency and in phase synchronism with said first source, other circuit means including additional rectifier means operatively interconnecting said second source of alternating current, said impedance means and said second load winding means, and further circuit means operatively connecting said impedance means to said feedback winding means whereby signals of alternately positive and negative polarity developed across said impedance means are applied to said feedback winding means as feedback signals.

4. A sub-harmonic signal generator employing a magnetic amplifier comprising in combination, first and second saturable magnetic core members, circuit means including a source of alternating current and first and second parallel current paths connecting opposite terminals of said alternating current source for driving said first and second core members toward saturation, said first path including a first winding inductively coupled to said first core member and a first impedance element which are separated by a first unidirectional current device, said second path including a second winding inductively coupled to said second core member and a second impedance element which are separated by a second unidirectional current device, said source of alternating current being connected between the junction of said first and second windings and the junction of said first and second impedance elements, output means for deriving an output signal from across the first and second impedance elements, other circuit means including a pair of saturable cores for resetting said first and second saturable magnetic core members, and feedback means including winding means inductively coupled to said pair of saturable cores, said feedback means being operatively connected to said output means to obtain a feedback signal of alternately positive and negative polarity therefrom, said output signal having a frequency which is a sub-harmonic of the frequency of said alternating current.

5. A sub-harmonic signal generator employing a magnetic amplifier for obtaining signals which have a sub-harmonic relationship to the frequency of an alternating current comprising, in combination, first and second saturable magnetic core members, circuit means including output means and a first source of alternating current for driving each of said first and second core members toward saturation during the same half cycle of the first alternating current source, other circuit means including a second source of alternating current in synchronism with the first source for resetting each of the first and second core members during the other half of each cycle of the first alternating current source, said other circuit means comprising a pair of parallel unidirectional current paths connected between the opposite terminals of the second alternating current source, each of said paths including a winding inductively coupled to an associated one of said core members, a first saturable reactor included in one of said paths, a second saturable reactor included in the other of said paths, and signal feedback means operatively connected to said output means and including additional winding means operatively associated with both said first and second saturable reactors, said feedback means providing a feedback signal, said first and second saturable reactors being constructed and arranged to utilize the feedback signal to provide an output to the output means having a sub-harmonic relationship to the frequency of the first and second sources of alternating current.

6. A sub-harmonic signal generator comprising, in combination, first saturable magnetic core means having bias winding means, feedback winding means and first load winding means inductively coupled thereto, second saturable magnetic core means having control winding means and second load winding means inductively coupled thereto, a first source of alternating current, circuit means connecting said first source of alternating current to said first load winding means and said control winding means and including means whereby the first saturable magnetic core means is driven to saturation during a preselected alternation of the first alternating current source and the voltage across said control winding means increases thereby resetting said second saturable magnetic core means, a second source of alternating current of the same frequency and in synchronism with the first source, means including unidirectional current means and impedance means connecting said second source of alternating current to the second load winding means in a manner whereby during a preselected alternation of the second source of alternating current said second saturable magnetic core means saturates thereby providing for a substantial signal across said impedance means, and circuit means connecting said feedback winding means to said impedance means whereby signals of alternately positive and negative polarity developed across said impedance means are applied to said feedback winding means to energize the same.

7. A sub-harmonic signal generator comprising, in combination, first saturable magnetic core means including bias winding means, feedback winding means, and first load winding means; second saturable magnetic core means including control winding means and second load winding means; a first source of alterating current; first rectifier means; circuit means connecting said first source of alternating current, said first rectifier means, said first load winding means, and said control winding means all in series; a second source of alternating current of the same frequency and in predetermined phase synchronism with said first source; second rectifier means; impedance means; other circuit means connecting said second source of alternating current, the second load winding means, said second rectifier means, and said impedance means in series; and feedback circuit means operatively connecting the feedback winding means of the first saturable magnetic core means across said impedance means to have the signal developed across said impedance means applied to the feedback winding means, a signal developed across said impedance means during the gating half cycle of said second saturable magnetic core means being fed back as a feedback signal to the first saturable magnetic core means in its reset half cycle, the output across said impedance means being affected by this feedback signal during the next gating half cycle of the second saturable magnetic core means and providing a further signal across the impedance means of a polarity opposite to that of the initial signal across said impedance means and of larger amplitude, said further signal being applied across said feedback winding means, the feedback action continuing to build up until the output signal across said impedance means attains its full amplitude at a frequency which is a sub-harmonic of the frequency of the first and second alternating current sources.

8. A sub-harmonic signal generator comprising, in combination, first and second saturable magnetic core members, circuit means for driving said first and second core members toward saturation and including output impedance means, further circuit means including a source of alternating current for resetting each of the first and second core members, said further circuit means including third and fourth saturable magnetic core members and a pair of parallel current paths connected between the opposite terminals of said alternating current source, one of said paths including winding means inductively coupled to said first core member and winding means inductively coupled to said third core member, the other of said paths including winding means inductively coupled to said second core member and winding means inductively coupled to said fourth core member, feedback winding means inductively coupled to said third and fourth core members, and additional circuit means operatively connecting said feedback winding means to said output impedance means to be energized by signals of alternately positive and negative polarity at said output impedance means.

9. A sub-harmonic signal generator comprising, in combination, first and second saturable magnetic core members, circuit means including a first source of alternating current for driving said first and second core members toward saturation, said circuit means comprising first and second parallel current paths connecting opposite terminals of said first alternating current source, said first path including a winding inductively coupled to said first core, a first impedance element, and a first unidirectional current device, said second path including a winding inductively coupled to said second core, a second impedance element, and a second unidirectional current device, further circuit means including a second source of alternating current of the same frequency and in synchronism with said first source for resetting said first and second core members, said further circuit means comprising an additional pair of parallel unidirectional current paths connected between opposite terminals of the second alternating current source, third and fourth saturable magnetic core members, one of said additional pair of paths including a load winding inductively coupled to said third core member and a control winding inductively coupled to said first core member, the other of said additional pair of paths including a load winding inductively coupled to said fourth core member and a control winding inductively coupled to said second core member, feedback winding means inductively coupled to said third and fourth core members, and additional circuit means operatively connecting said feedback winding means across said first and second impedance elements to have the feedback winding means energized by the resultant of signals across said first and second impedance elements.

10. A sub-harmonic signal generator comprising, in combination, first and second saturable magnetic core members, circuit means including a first source of alternating current for driving said first and second core members toward saturation, said circuit means comprising first and second parallel current paths connecting opposite terminals of said first alternating current source, said first path including a first load winding inductively coupled to said first core member, a first impedance element and a first unidirectional current device, said second path including a second load winding inductively coupled to said second core member, a second impedance element and a second unidirectional current device, said first unidirectional current device and said second unidirectional current device being poled in predetermined directions whereby current from the first alternating current source flows through both the first and second current paths and first and second impedance elements during the same alternation of said first source, said last-named alternation being the gating alternation for the first and second load windings, the signals across the first and second impedance elements resulting from current flows in the first and second paths being of opposite polarity with respect to each other, further circuit means including a second source of alternating current of the same frequency and in synchronism with said first source for resetting said first and second saturable magnetic core members, said further circuit means comprising an additional pair of parallel unidirectional current paths connected between opposite terminals of the second alternating current source, third and fourth saturable magnetic core members, one path of said additional pair of paths including a third load winding inductively coupled to said third core member, a control winding inductively coupled to said first core member, and a third unidirectional current device, the other path of said additional pair of paths including a fourth load winding inductively coupled to said fourth core member, a control winding inductively coupled to said second core member, and a fourth unidirectional current device, said third and fourth unidirectional current devices being poled in predetermined directions whereby current from the second source of alternating current flows through both the third and fourth unidirectional current devices during the same alternation of said second source and resets the first and second core members, said last-named alternation being the gating alternation for the third and fourth load windings, feedback winding means inductively coupled to said third and fourth core members, and additional circuit means operatively connecting said feedback winding means across both said first and second impedance elements to have the feedback winding means energized by the resultant signal across said first and second impedance elements, the resultant signal developed across said first and second impedance elements during the gating alternation for said first and second load windings as a result of a circuit disturbance being applied as a feedback signal to the feedback winding means to reset the third and fourth saturable magnetic core members, said resultant feedback signal being of an amplitude and polarity to overcompensate for the initial circuit disturbance thereby providing a further resultant signal across the first and second impedance elements of a polarity opposite to that of the first-named resultant signal, said further resultant signal of opposite polarity being fed back to said feedback winding means and resulting in the appearance of an additional resultant signal of the same polarity as the first-named resultant signal across said first and second impedance elements, the resultant signals across said first and second impedance elements occurring at a frequency which is a sub-harmonic of the frequency of the first and second alternating current sources.

11. A signal generator according to claim 10 including in addition bias winding means for the third and fourth saturable magnetic core members, and a source of biasing potential operatively connected to the bias winding means, the value of the current from said source of biasing potential flowing in the bias winding means controlling the times of saturation of the third and fourth saturable magnetic core members.

12. A signal generator for signals which have a sub-harmonic frequency relationship to the frequency of an alternating current source comprising, in combination, first and second saturable magnetic core members, first and second load windings respectively for the first and second core members, circuit means including output means, said first and second load windings and a first source of alternating current for driving each of said first and second core members toward saturation during the same alternation of the first alternating current source, said circuit means being constructed and arranged to provide a signal in the output means of selectively positive and negative polarity in accordance with the relative saturation times of the first and second core members, other circuit means including a second source of alternating current in synchronism with the first source for resetting each of the first and second core members during the other alternation of the first alternating current source, said other circuit means comprising first and second parallel unidirectional current paths connected between opposite terminals of the second alternating current source, said first path including a first saturable reactor and a first control winding inductively coupled to said first core member, said second path including a second saturable reactor and a second control winding inductively coupled to said second core member, said first and second unidirectional current paths having current flows therein during the same alternation of said second source of alternating current, signal feedback circuit means operatively connected to said output means and including feedback winding means inductively coupled to both said first and second saturable reactors to control the resets and accordingly the saturation times thereof, the first saturable reactor controlling the reset and saturation time of the first core member and the second saturable reactor controlling the reset and saturation time of the second core member to thereby control the polarity of the feedback signal in accordnace with which of said saturable reactors saturates first, said feedback circuit means providing a feedback signal of alternatively positive and negative polarity across said feedback winding means, said first and second saturable reactors being constructed and arranged to utilize the feedback signal to overcompensate during one alternation of the second source for the difference in time at which the first and second saturable reactors saturated during the preceding alternation of like polarity of the second source, alternate reactors of the first and second saturable reactors saturating first during alternate alternations of like polarity of the second source of alternating current to thereby provide in the output means a signal having a sub-harmonic relationship to the frequency of the first and second sources of alternating current.

References Cited in the file of this patent
UNITED STATES PATENTS

| | | |
|---|---|---|
| 2,747,109 | Montner | May 22, 1956 |
| 2,770,737 | Ramey | Nov. 13, 1956 |
| 2,816,260 | Scorgie | Dec. 10, 1957 |
| 2,862,197 | Ringelman et al. | Nov. 25, 1958 |